(12) United States Patent
Graf

(10) Patent No.: US 9,200,934 B2
(45) Date of Patent: Dec. 1, 2015

(54) COIL SYSTEM OF A MAGNETO INDUCTIVE FLOW MEASURING DEVICE

(75) Inventor: Oliver Graf, Kanerkinden (CH)

(73) Assignee: Endress + Hauser Flowtec AG, Reinach (CH)

(*) Notice: Subject to any disclaimer, the term of this patent is extended or adjusted under 35 U.S.C. 154(b) by 66 days.

(21) Appl. No.: 14/346,994

(22) PCT Filed: Aug. 16, 2012

(86) PCT No.: PCT/EP2012/066033
§ 371 (c)(1),
(2), (4) Date: Mar. 25, 2014

(87) PCT Pub. No.: WO2013/045170
PCT Pub. Date: Apr. 4, 2013

(65) Prior Publication Data
US 2014/0230564 A1    Aug. 21, 2014

(30) Foreign Application Priority Data
Sep. 27, 2011  (DE) .......................... 10 2011 083 548

(51) Int. Cl.
*G01F 1/66*      (2006.01)
*G01F 1/58*      (2006.01)
*H01F 27/245*    (2006.01)

(52) U.S. Cl.
CPC ............... *G01F 1/586* (2013.01); *G01F 1/588* (2013.01); *H01F 27/245* (2013.01)

(58) Field of Classification Search
USPC .......................................... 73/861.11, 861.12
See application file for complete search history.

(56) References Cited

U.S. PATENT DOCUMENTS

| 2,844,568 | A | 7/1958 | Mertz |
| 3,191,436 | A | 6/1965 | Davis |
| 4,899,592 | A | 2/1990 | Behrens |
| 5,540,103 | A | 7/1996 | Zingg |
| 7,627,939 | B2* | 12/2009 | Sulzer et al. ..................... 29/458 |
| 7,798,015 | B2* | 9/2010 | Zingg et al. ................ 73/861.12 |
| 8,418,565 | B2* | 4/2013 | Herremans et al. ............. 73/861 |

FOREIGN PATENT DOCUMENTS

| DE | 1772087 | 8/1958 |
| DE | 7504899 | 7/1975 |

(Continued)

OTHER PUBLICATIONS

Apr. 10, 2014 English Translation of IPR, WIPO, Geneva, Switzerland.

(Continued)

*Primary Examiner* — Jewel V Thompson
(74) *Attorney, Agent, or Firm* — Bacon & Thomas, PLLC

(57) ABSTRACT

A coil system for a magneto inductive, flow measuring device, which comprises: a coil and core sheets led through the coil. The core sheets have equal shape and size, wherein each core sheet has a first and a second leg, which are connected together to form an L shape. At least a first core sheet and a second core sheet are so led through the coil that the first leg of the first core sheet and the first leg of the second core sheet extend parallel to one another and that the second leg of the first core sheet and the second leg of the second core sheet extend parallel to one another, wherein the second leg of the first core sheet and the second leg of the second core sheet are arranged at different ends of the coil.

15 Claims, 6 Drawing Sheets

(56) References Cited

FOREIGN PATENT DOCUMENTS

| | | |
|---|---|---|
| DE | 102004063020 A1 | 7/2006 |
| EP | 1674836 A1 | 6/2006 |
| GB | 1341038 | 12/1973 |
| WO | 2013045170 A1 | 4/2013 |

OTHER PUBLICATIONS

May 18, 2012 German Search Report, German Patent Office, Munich.

Jan. 2, 2013 International Search Report, EPO, The Netherlands.

* cited by examiner

COIL SYSTEM OF A MAGNETO INDUCTIVE FLOW MEASURING DEVICE

TECHNICAL FIELD

The present invention relates to a coil system of a magneto inductive flow measuring device, wherein the coil system includes a coil and core sheets led through the coil.

BACKGROUND DISCUSSION

Magneto inductive flow measuring devices utilize the principle of electrodynamic induction for volumetric flow measurement and are disclosed in a large number of publications. Charge carriers of the medium moved perpendicularly to a magnetic field induce a measurement voltage in measuring electrodes arranged essentially perpendicularly to the flow direction of the medium and perpendicularly to the direction of the magnetic field. The measurement voltage induced in the measuring electrodes is proportional to the flow velocity of the medium averaged over the cross section of the measuring tube, thus proportional to the volume flow rate. If the density of the medium is known, the mass flow in the pipeline, respectively in the measuring tube, can be determined. The measurement voltage is usually tapped via a measuring electrode pair, which is arranged in the region of maximum magnetic field strength relative to the coordinate along the measuring tube axis and where, thus, the maximum measurement voltage is to be expected. The electrodes are usually galvanically coupled with the medium; known, however, also, are magneto inductive flow measuring devices with contactless, capacitively coupling electrodes.

The measuring tube can be manufactured, in such case, either of an electrically conductive, non-magnetic material, e.g. stainless steel, or of an electrically insulating material. If the measuring tube is manufactured of an electrically conductive material, then it must be lined in the region coming in contact with the medium with a liner of an electrically insulating material. The liner is composed, depending on temperature and medium, for example, of a thermoplastic, thermosetting or elastomeric, synthetic material. Known, however, are also magneto inductive flow measuring devices equipped with a ceramic lining.

An electrode can be subdivided essentially into an electrode head, which comes at least partially in contact with a medium, which flows through the measuring tube, and an electrode shaft, which is encapsulated almost completely in the wall of the measuring tube.

Besides the magnet system, the electrodes are the central components of a magneto inductive, flow measuring device. In the embodiment and arrangement of the electrodes, it is to be heeded that they can be mounted as simply as possible into the measuring tube and that subsequently in measurement operation no sealing problems occur; moreover, the electrodes should provide a sensitive and simultaneously low-disturbance registering of the measurement signal.

Besides the measuring electrodes serving for tapping a measurement signal, often additional electrodes in the form of reference, or grounding, electrodes are installed in the measuring tube, which serve to measure an electrical, reference potential or to detect partially filled measuring tubes or to register the temperature of the medium by means of an installed temperature sensor.

SUMMARY OF THE INVENTION

An object of the invention is to provide a simple and cost effectively manufactured, magneto inductive, flow measuring device.

The object is achieved by a coil system for a magneto inductive, flow measuring device, comprising: a coil; and core sheets led through said coil, wherein: said core sheets have equal shape and size; each core sheet has a first and a second leg, which are connected together to form an L shape; at least a first core sheet and a second core sheet are so led through said coil that said first leg of said first core sheet and said first leg of said second core sheet extend parallel to one another; said second leg of said first core sheet and said second leg of said second core sheet extend parallel to one another; and said second leg of said first core sheet and said second leg of said second core sheet are arranged at different ends of said coil.

BRIEF DESCRIPTION OF THE DRAWINGS

The invention permits numerous forms of embodiment. Some thereof will now be explained in greater detail based on the appended figures of the drawing. Equal elements are provided in the figures with equal reference characters. The figures of the drawing show as follows.

DETAILED DISCUSSION IN CONJUNCTION WITH THE DRAWINGS

Figure 1:
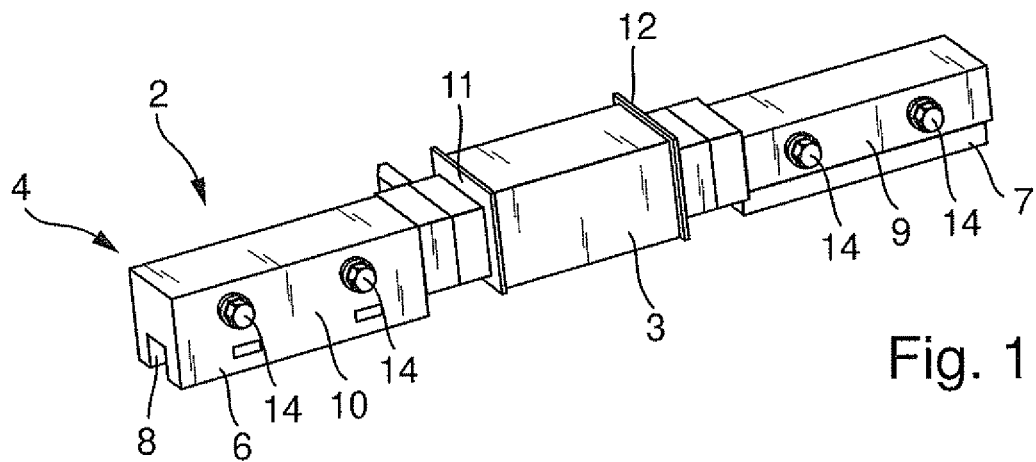
FIG. 1 shows perspectively, a coil system of the invention for a magneto inductive, flow measuring device.

FIG. 1 shows a coil system 2 of the invention for a magneto inductive, flow measuring device. Coil system 1 includes a coil 3 and at least two, especially a number of, core sheets 6, 7 and 8 arranged to form at least two stacks, which are led through the coil 3 and which form the coil core 4 of the coil 3.

Figure 3:
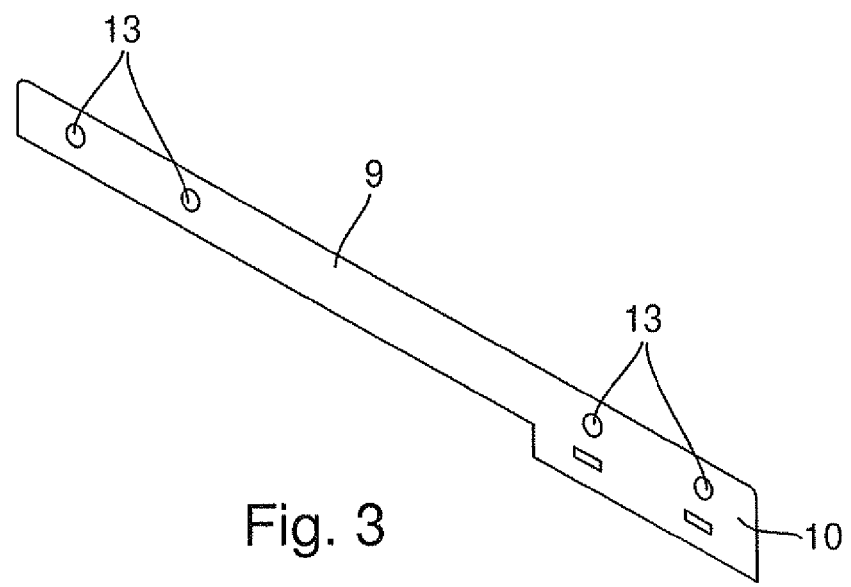
FIG. 3 shows perspectively, a core sheet of the invention.

According to the invention, all of the core sheets 6, 7 and 8 are embodied identically and have, thus, in each case, equal shape and size. As a first core sheet 6 shows in FIG. 3, each core sheet 6 has a first leg 9 and a second leg 10, which are connected with one another to form an L shape. The same holds naturally for the second core sheet 7, the third core sheet 8 and any other core sheet. The first and second legs 9 and 10 form, for example, an angle of 90°.

Further developed, each core sheet 6 has bores 13, by which they are bolted with one another. The bores 13 are arranged symmetrically with, reference to the length of the first leg 9 of the core sheet 6, so that in the case of an oppositely oriented core sheet, whose first leg is flush with the first leg 9 of the core sheet 6, the two first legs are, thus, coincident, the bores coincide, so that the two core sheets can be bolted together. Core sheet 6 has rounded corners, for example, with radii of size R0.5 to R10, depending on the size of the core sheet. Not rounded, however, are the two corners of the free end of the second leg 10, which end contacts a pole shoe in the assembled state of the coil system.

If clamping bands are used for affixing the coil system on the measuring tube, each core sheet can, such as here, have other bores, here with rectangular cross section, through which the clamping bands are led for connecting the coil system securely with the measuring tube.

A core sheet of the invention comprises especially a metal having a magnetic relative permeability pr of at least 50, especially at least 1000 to 50,000. It is formed, for example, of M165 or M330 steel.

According to the invention, the first core sheet 6 and the second core sheet 7 are so led through the coil 3 that the first leg 9 of the first core sheet 6 and the first leg 9 of the second core sheet 7 extend parallel to one another. In the also here illustrated further development of the invention, the coil system 2 includes a stack of third core sheets 8, whose first legs 9 likewise extend parallel to the first legs of the first and second core sheets 6 and 7, such as FIG. 1 makes clear.

Further according to the invention, the second leg 10 of the first core sheet 6 and the second leg 10 of the second core sheet 7 extend parallel to one another, wherein the second leg of the first core sheet 6 and the second leg 10 of the second core sheet 7 are arranged at different ends 11 and 12 of the coil 3.

Further developed, the second leg 10 of the first core sheet 6 and, in given cases, the second leg 10 of the third core sheet 8 and the second leg 10 of the second core sheet 7 point in the same direction, so that the core sheets 6, 7 and 8 form a U shaped coil core 4. The second core sheet 7 is, in such case, especially led centrally through the coil 3 between the first and the third core sheets 6 and 8.

Coil 3 is, for example, a cylindrical coil. By way of example, it is provided with a cross sectionally rectangular or square, coil core 4 of core sheets 6, 7 and 8. It comprises, in such case, e.g. copper wire wound on a coil form of synthetic material, e.g. a plastic.

Arranged between coil 3 and the second legs 10 of the core sheets 6, 7 and 8 are electrically insulating spacers 16. These are especially rings of synthetic material, for example, a glass fiber reinforced thermoplastic such as e.g. polyamide PA66. Spacers 16 are applied, in order to establish the separation of the coil 3 from the second legs 10 of the core sheets 6, 7 and 8 and, in given cases, in order to position and to secure the coil 3 centrally between the second legs 10 of the core sheets 6, 7 and 8. Thus, an option is to use different core sheets with especially different lengths of their first legs with, in each case, a coil of equal construction. Therewith, it is possible to build with many same parts of respectively different size coil systems for differently large magneto inductive, flow measuring devices, especially for differently large nominal diameters of the measuring tubes of the magneto inductive, flow measuring devices. The measuring tube of a magneto inductive, flow measuring device of the invention has especially a size between DN700 and DN2400, especially between DN1350 and DN2400. With identical components, thus coil systems, for example, for nominal diameters of DN700 to DN1200 and DN1350 to DN 2400 can be manufactured.

A magnetically insulating material has a magnetic relative permeability μr of less 1, especially near 0. Electrically insulating materials have a resistivity greater than $1*10^{-10}$ $\Omega mm^2/m$, especially greater than $1*10^{-15}$ $\Omega mm^2/m$. These data are for standard conditions.

Alternatively thereto, that not only the bores but also the first legs 9 of the core sheets 6, 7 and 8 coincide with one another, in another embodiment, the first leg 9 of the first core sheet 6 and the first leg 9 of the second core sheet 7 are arranged axially offset from one another. In this way, a length of the coil system parallel to the first legs 9 of the core sheets 6 and 7 is greater than a length of the first legs 9 of the core sheets 6 and 7. Their ends are then not flush with one another. The first legs 9 are not coincident. The bores, especially at least two, in the core sheets do, however, coincide, since these are arranged in the core sheets corresponding to the axial offset of the core sheets from one another. Such a coil system is not developed in the figures. Analogously, in the case of core sheets led through the coil in stacks, the first legs 9 of the first core sheets 6 and the first legs 9 of the second core sheets 7 are arranged axially offset relative to one another. Also therewith, differently large coil systems can be implemented.

Through the previously introduced bores 13 in the core sheets 6, 7 and 8, the core sheets 6, 7 and 8 are bolted together by means of bolts 14. The bores 13 are so arranged in the core sheets 6, 7 and 8 that, in the assembled state of the coil system 2, the bores 13 of the first core sheet 6 coincide with the bores 13 of the second core sheet 7, so that the first and second core sheets 6 and 7 can be bolted together through the bores 13. Analogously, then also the third core sheet 8 is boltable, since it coincides with the first core sheet. This is achieved through the symmetry of the bores 13 with reference to the length of the first leg 9 of each core sheet 6, 7 and 8.

Figure 2:
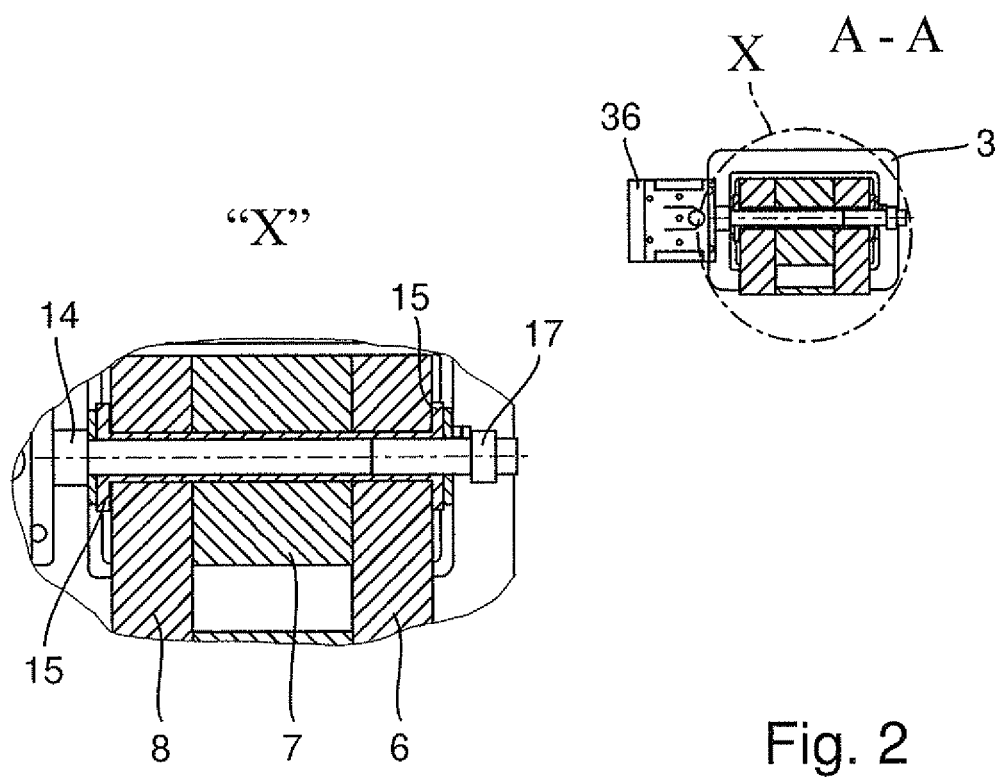
FIG. 2 shows the coil system in cross section.

FIG. 2 shows the coil system 2 of FIG. 1 transversely sectioned. The core sheets 6, 7 and 8 are led through the coil 3 in stacks, here in three stacks, of, in each case, a plurality of core sheets 6, 7 and 8. The core sheets 6, 7 and 8 are led through the opening of the coil 3, in such a number of mutually contacting sheets that at least the width of the opening, especially the whole opening, is filled. The structural embodiment, especially of the first leg 9, of the core sheets 6, 7 and 8 depends, consequently, on the structural shape of the coil 3 and, conversely. The number of core sheets 6, 7 and 8 led through the coil 3 is likewise dependent thereon.

The bolts 14 are, in such case, in a form of embodiment, electrically and/or magnetically insulated from the core sheets 6, 7 and 8 by means of bolt sleeves 15.

In the illustrated example, two bolt sleeves 15 arranged opposite one another are so prestressed relative to one another by means of the bolted connection, here formed of bolt and nut 17, that at least one bolt sleeve 15 shortens axially by a predetermined measure, such that it at least partially assumes the shape of a bellows. For purposes of insulation, the bolt sleeves 15 prevent the core sheets 6, 7 and 8 from contacting the bolts 14. In order to accommodate tolerances, for example, in the thicknesses of the core sheet stacks, the bolt sleeves 15 are, in such case, so embodied that the sum of their lengths in the unassembled state, which lie in the assembled state in the core sheet stacks, exceeds the thickness of the core sheet stack by a predetermined amount. The predetermined amount is, in such case, less than the greatest possible axial compression of the bolt sleeves 15, without that these are deformed beyond the parameters of the invention.

In the assembling, the bolt sleeves 15 are inserted from both sides into the core sheet stacks. Their annular tips contact, in such case. If now a bolt 14 is inserted through the bolt sleeves 15 and the nut tightened, the bolt head introduces an axially acting force into the bolt sleeves 15, which leads to the fact that at least one of the bolt sleeves 15 is deformed according to the invention, until the bolt head comes to rest and the sum of the lengths of the bolt sleeves 15 in the core sheet stack corresponds to the thickness of the core sheet stacks.

Of course, this can also be achieved by other measures, for example, by non-conductive bolts or bolt sleeves with mutually engaging rings on their tips, wherein a first ring has an inner diameter, which is greater than or equal to the bolt guiding region of the bolt sleeve and has an outer diameter, which is less than that of the bolt guiding region of the bolt sleeve, wherein the second ring then has an inner diameter, which is greater than or equal to the outer diameter of the first ring and an outer diameter, which is less than or equal to that of the bolt guiding region of the bolt sleeve.

An advantage of the invention compared with these solutions is, however, that the bolt sleeve 15 is simple and cost effective to manufacture.

Figure 4:
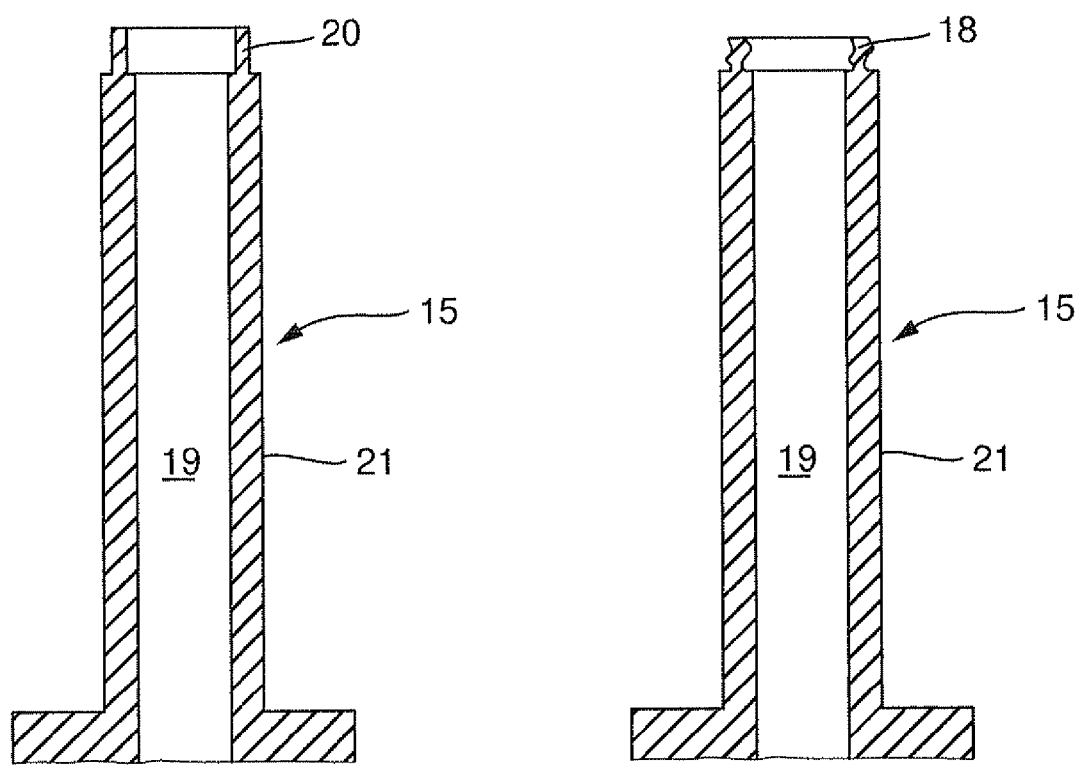
FIG. 4 shows bolt sleeves of the invention.

Such bolt sleeves 15 for electrical and/or magnetic insulation of bolts are shown in FIG. 4; left shows the state after manufacture, right with a region, which has assumed the shape of a bellows 18. The bolt sleeve 15 includes a bore 19 for accommodating and guiding the bolt. The bore 19 includes for guiding the bolt in a region 21 of the bolt sleeve 15 provided therefore an inner diameter constant over the length of the region 21. The inner diameter is determined by the bore 19.

Bolt sleeve 15 is in a further development so embodied that, in the case of a force of predetermined size acting axially on it, it is axially shortened by a predetermined amount, wherein it assumes at least partially the shape of a bellows 18. In the illustrated example of an embodiment, the bolt sleeve 15 has at its tip a region having a lessened wall thickness, which, in the case of an axially acting force of predetermined size, assumes the shape of a bellows 18 and, thus, is axially shortened by a predetermined amount. In the illustrated example of an embodiment, the region with reduced wall thickness is a ring 20 at the tip of the bolt sleeve 15. Ring 20 has a greater inner diameter and a smaller outer diameter than the bolt sleeve 15 in a region 21 guiding the bolt. Bolt sleeve 15 is, thus, not suitable for guiding the bolt in the region of the ring 20.

If the bolt sleeve 15 is supplied axially with a force, which has or exceeds a predetermined size, then ring 20 is deformed such that it assumes the shape of a bellows 18.

The length of the region with the lessened wall thickness, thus here the length of the ring 20, is, according to a form of embodiment of the invention, small in comparison with the axial length of the region 21 of the bolt sleeve 15 used for guiding the bolt.

If the bolt sleeve 15 assumes partially the shape of a bellows 18, then, according to an additional further development of the bolt sleeve of the invention, the bellows has a smaller outer diameter than the bolt sleeve 15 in a region 21 for guiding the bolt. If, for example, at least two sheet metal pieces to be bolted together with a bolt and to be insulated from the bolt are bolted together, then these sheet metal pieces are not shifted relative to one another radially to the bolt sleeve. Thus, because of the smaller outer diameter of the bellows 18, the deformation of the bolt sleeve does not lead to a force radially to the bolt sleeve on one of the sheet metal pieces.

A further developed bolt sleeve is comprised especially of a polymer material, such as e.g. polyether sulphone. Alternative materials include, for example, polyetheretherketone or polyphenylene sulfide. The bolt sleeves are, thus, electrically and, in given cases, magnetically insulating.

Naturally, the bolt sleeves, as well as also the bolt sleeves of the state of the art, are, to a certain amount, axially elastically deformable. The amount is dependent especially on the introduced force, the material and the wall thickness of the bolt sleeve.

The deformation of the invention of the bolt sleeve 15 to form a bellows shaped section is elastic or partially plastic.

Figure 5:
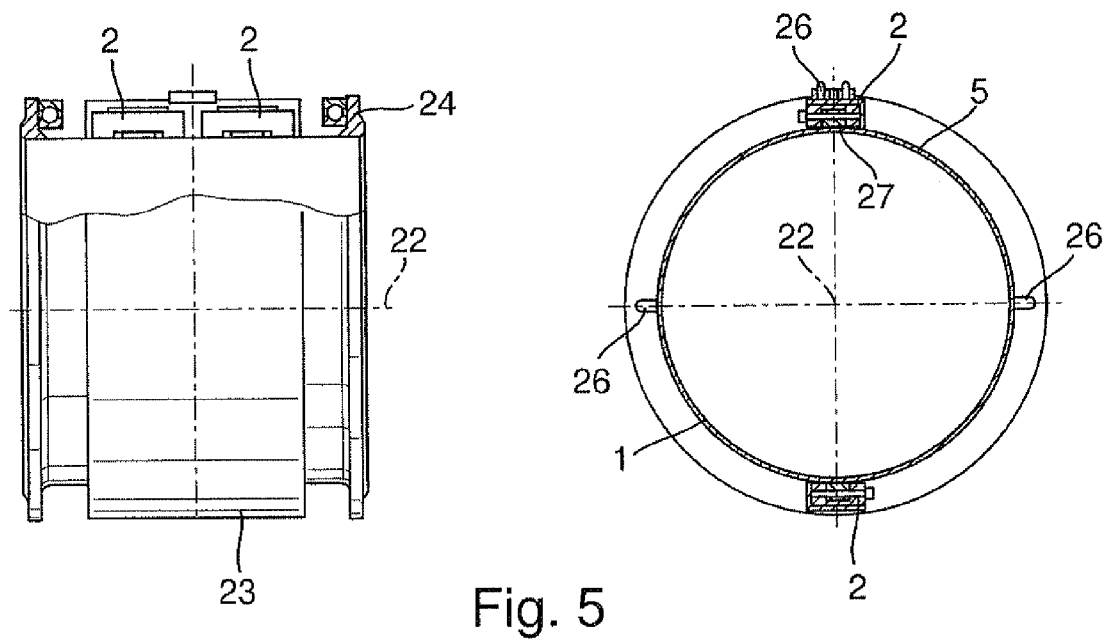
FIG. 5 is a magneto inductive, flow measuring device of the invention in a partially sectioned, side view and in cross section.

FIG. 5 shows, in lateral, partial section and in cross section, a magneto inductive, flow measuring device of the invention, which includes a measuring tube 1 and at least one coil system 2 of the invention. The coil systems 2 are, in such case, encapsulated by a surrounding housing 23. Nevertheless, the housing 23 has a low thickness, this being a further advantage of the invention. In an additional further development of the invention, the coil systems 2 have a smaller thickness in the radial direction of the measuring tube 1 than flanges 24 of the measuring tube 1. Only an apparatus 25 for connecting a measurement transmitter can extend beyond. Such an apparatus 25 includes, in such case, also cable guides for contacting the coil systems and the electrodes.

The coil systems 2 are especially so arranged on the measuring tube 1 that the second legs of the core sheets point toward the measuring tube 1. Measuring electrodes 26, a so-called measured material monitoring electrode 27 and a reference electrode 28 extend into the measuring tube 1 of this example.

Figure 6:
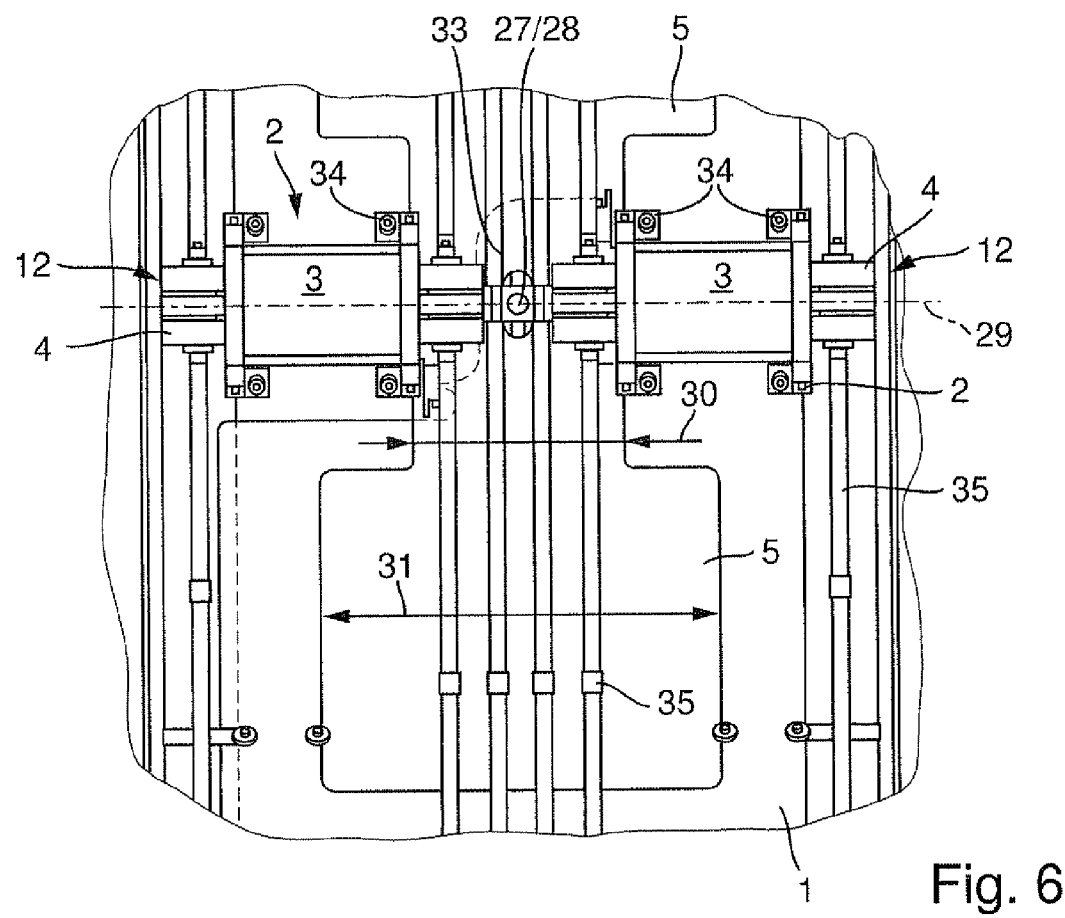
FIG. 6 is a magneto inductive, flow measuring device of the invention in plan view.

FIG. 6 shows, in plan view, a further developed magneto inductive, flow measuring device having a measuring tube 1 and coil systems 2 arranged thereon. Each coil system 2 includes a coil 3 and a coil core 4 led through the coil 3. In a further development, the coil core 4 protrudes from at least one end 11 of the coil 3. In this example of an embodiment, the coil core 4, which here includes a number of core sheets, protrudes symmetrically from both end faces 11 and 12 of the coil 3. The core sheets are L shaped and so oriented relative to one another that in a longitudinal section through the coil system, the coil core appears U shaped.

Two coil systems 2 are so arranged, in such case, in a line 29 parallel to a longitudinal axis of the measuring tube on the measuring tube 1 that a pole shoe 5 is arranged between the measuring tube 1 and the coil cores 4 protruding out from the coil systems 2.

The coils 3 comprise, for example, a copper wire wound helically on a hollow cylindrical coil body of a polymer. The two coil systems have the same longitudinal axis 29, which extends especially parallel to a longitudinal axis of the measuring tube.

Furthermore, it is apparent from FIG. 6 that the pole shoe 5 has a first width 30 parallel to the longitudinal axis of the measuring tube 1, which is less than or equal to a separation of the two coils 3 from one another. Pole shoe 5 is, in such case, so arranged on the measuring tube 1 and oriented relative to the coils 3 that the first width 30 is located in the region of the coils 3 of the two coil systems 2. The two coils 3 are so opposed that the pole shoe 5 lies between them, especially between their two opposing end faces 11. The separation of the two coils 3 is measured, thus, between the two oppositely lying end faces 11 of the coils. Additionally, the pole shoe 5 has a second width 31 parallel to the longitudinal axis of the measuring tube 1, which is greater than the separation of the two oppositely lying end faces 11 of the coils 3. In general, the pole shoe 5 extends, at least partially, around the measuring tube 1.

The region of the lesser first width 30 of the pole shoe 5 extends, in such case, across the width of the coil core 4, especially across the entire width of the coils 3, perpendicular to the longitudinal axis 29 of the coil systems 2, which lie on the line of their longitudinal axes 29. In the shown example of an embodiment, the region of the lesser first width 30 of the pole shoe 5 is as long as the width of the coil systems 2.

Figure 7:
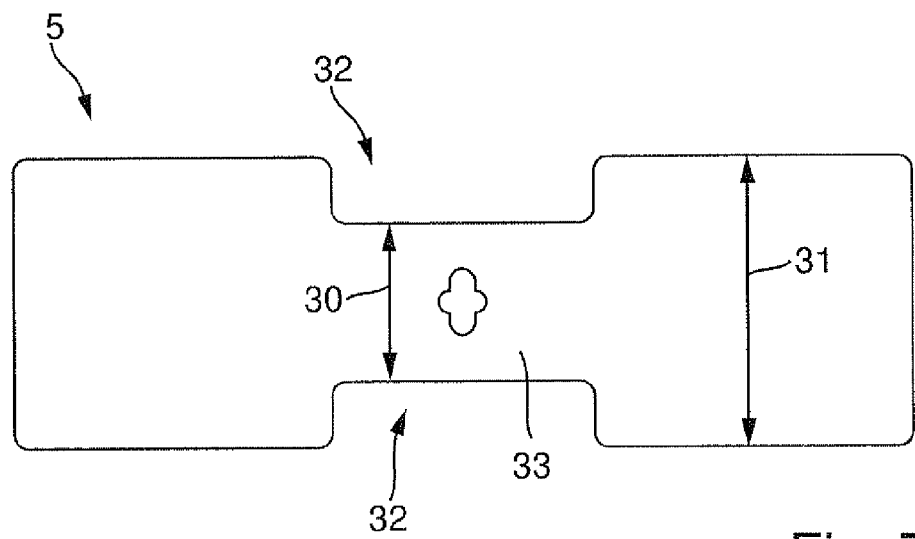
FIG. 7 is a pole shoe of the invention in plan view.

A further developed pole shoe 5 is shown in FIG. 7 projected into the plane of the drawing. It has a length and a second width 31. Furthermore, it has the shape of a simply curved shell. In plan view, thus projected on the plane of the drawing, pole shoe 5 has, apart from the rounded corners and the cutouts 32, virtually a rectangular appearance. The cutouts 32 are arranged symmetrically and result in the first width 30 in the region of the cutouts 32. Alternative embodiments provide other options. For example, another option has a double lobed appearance in plan view. Furthermore, pole shoe 5 includes a bore 33 for allowing the passage of an electrode, especially a measured material monitoring electrode or a reference electrode.

If, such as shown in FIG. 6, the magneto inductive, flow measuring device is projected into a plane, which extends parallel to the measuring tube axis and perpendicular to an additional plane, in which the measuring tube axis and the longitudinal axes 29 of the coils 3 lie, then, according to a form of embodiment of the invention, the coil cores 4 of the coils 3 overlap exclusively the pole shoe 5. As already mentioned above, the pole shoe is contacted by one or more coil systems 2, however, only by the second legs of the first and third core sheets, respectively the second legs of the core sheets of the first and third core sheet stacks.

Figure 8:
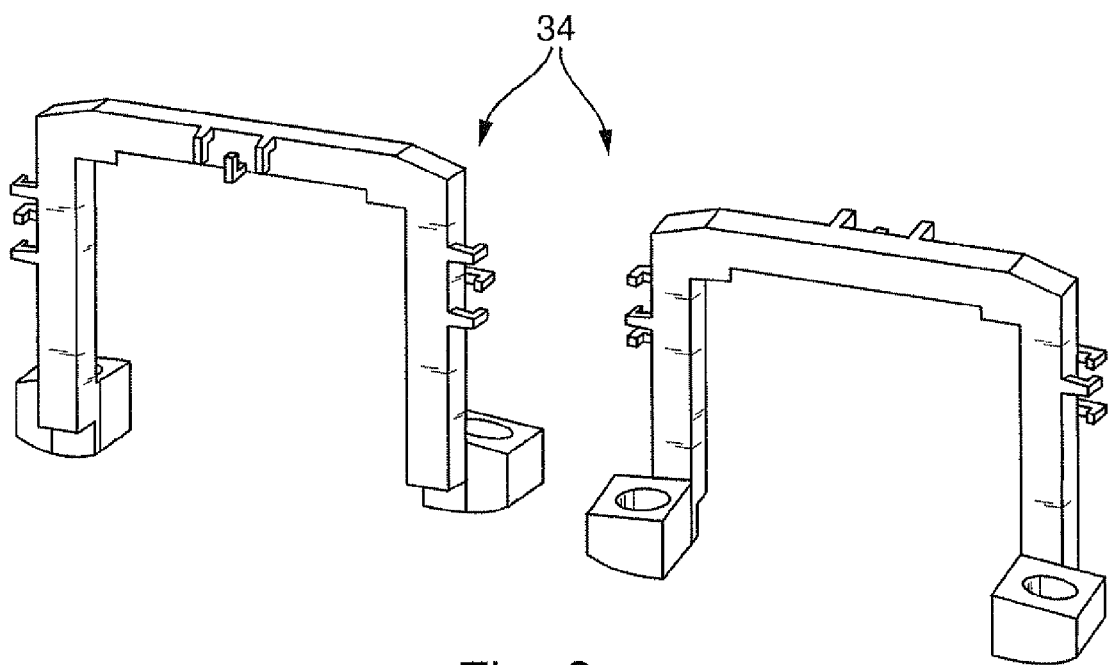
FIG. 8 shows perspectively, a holding bracket of the invention in front and rear view.

FIG. 8 shows a holding bracket 34 perspectively in two views. Holding bracket 34 serves to position a coil system on the measuring tube. In order to position four coil systems on the measuring tube, e.g. eight holding brackets 34 are utilized, two for each coil system. Nevertheless, these are eight holding brackets 34 of equal construction.

Figure 9:
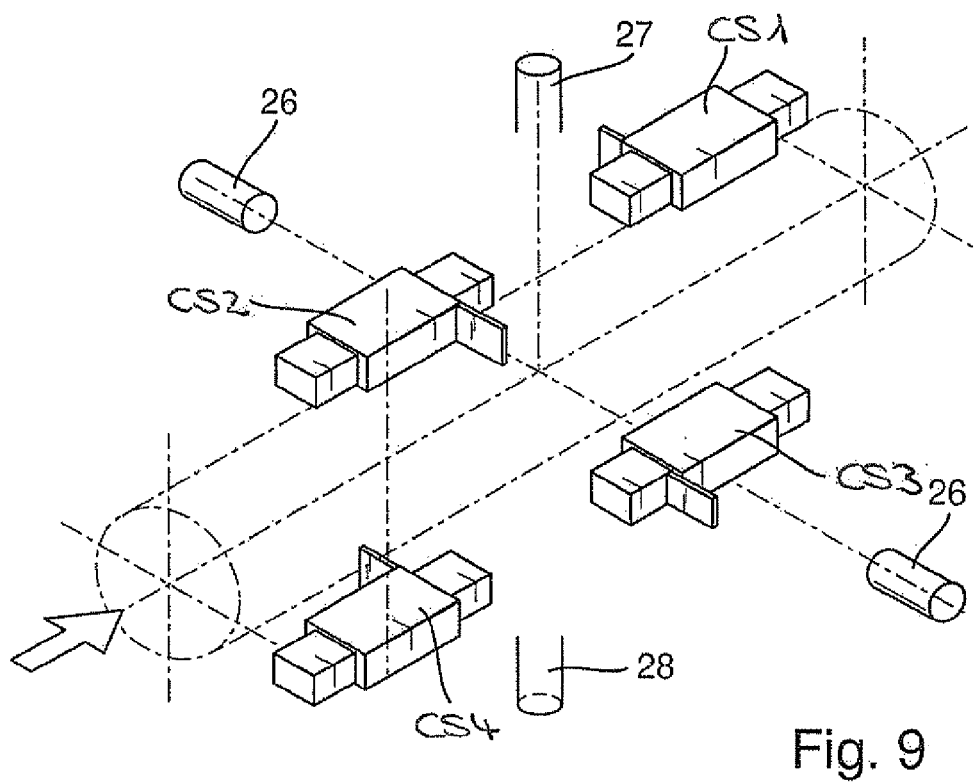
FIG. 9 shows schematically, the arrangement of four coils on the measuring tube.
Figure 10:
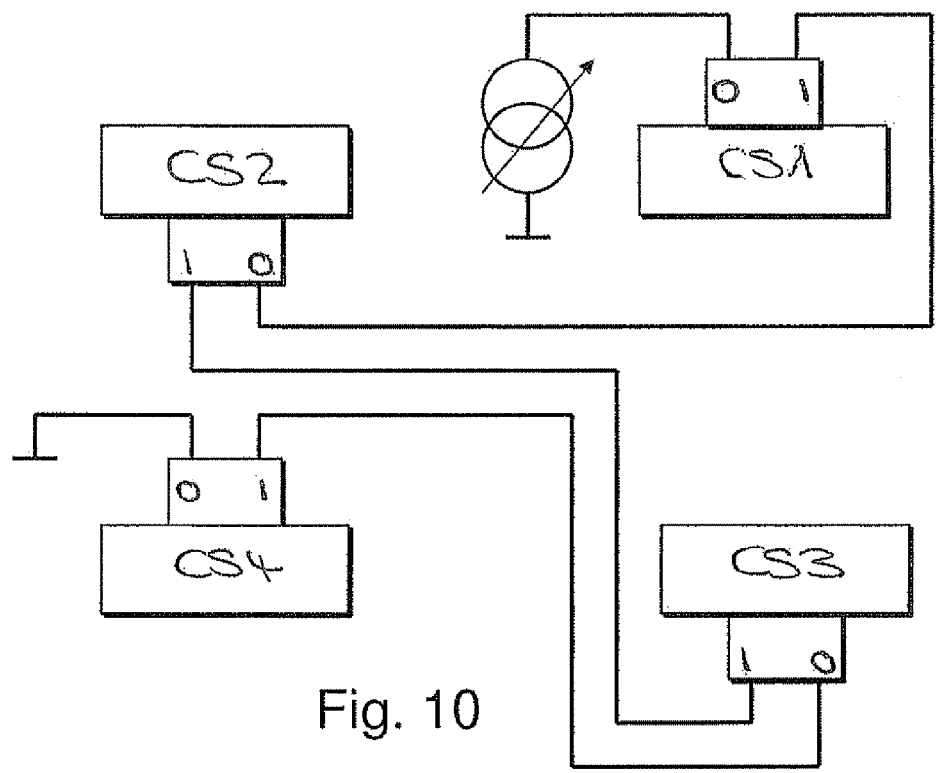
FIG. 10 shows modeling the connecting of the four coils.
Figure 11:
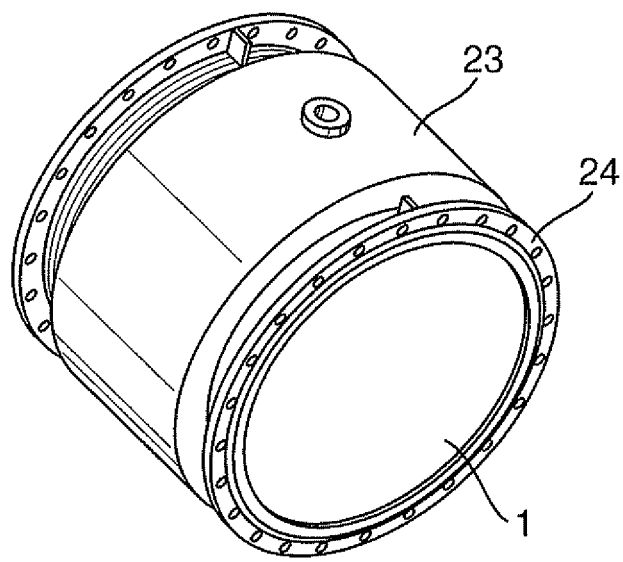
FIG. 11 shows perspectively, a magneto inductive, flow measuring device of the invention with coil systems enclosed in a housing.

FIG. 9 and FIG. 10 show a magneto inductive flow device with the described positions of the coil systems and the connecting of their coils. Since the coils are identical, their positions and connections can also be indicated on the schematically sketched connection tabs for their electrical connection. The letter I represents, in such case, electrical current into the winding of a coil and the letter O electrical current out of the winding of a coil. CS1, CS2, CS3 and CS4 designate the four coil systems. Besides the two measuring electrodes, two other electrodes are provided in the measuring tube wall. The measuring electrodes lie in a line perpendicular to the measuring tube axis in a plane with this and perpendicular to the plane, which contains the longitudinal axes of the coil systems. The additional electrodes involve, for example, a measured material monitoring electrode and a reference electrode. Both pass through respective bores of the two pole shoes between the coil systems. They lie therewith in a line perpendicular to the measuring tube axis, in the plane of the longitudinal axes of the coil systems. The arrow indicates the flow direction of the flow through the measuring tube.

The invention claimed is:

1. A coil system for a magneto inductive, flow measuring device, comprising:
   a coil;
   and core sheets led through said coil, wherein:
   said core sheets have equal shape and size;
   each core sheet has a first and a second leg, which are connected together to form an L shape;
   at least a first core sheet and a second core sheet are so led through said coil that said first leg of said first core sheet and said first leg of said second core sheet extend parallel to one another;
   said second leg of said first core sheet and said second leg of said second core sheet extend parallel to one another; and
   said second leg of said first core sheet and said second leg of said second core sheet are arranged at different ends of said coil.

2. The coil system as claimed in claim 1, wherein:
   at least three core sheets are so led through said coil that said first legs of said core sheets and said second legs of said first and a third core sheet and said second leg of said second core sheet form a U shaped coil core; and
   said second core sheet is arranged between said first and said third core sheets.

3. The coil system as claimed in claim 1, wherein:
   said core sheets are led through said coil in stacks, in each case, of a plurality of core sheets.

4. The coil system as claimed in claim 1, wherein:
   core sheets have predetermined bores, which are so arranged that the bores of said first core sheet coincide with the bores of said second core sheet.

5. The coil system as claimed in claim 1, wherein:
   said core sheets are bolted by means of bolts; and
   said bolts are insulated from said core sheets by means of non-conducting bolt sleeves.

6. The coil system as claimed in claim 5, wherein:
   said bolt sleeves are, in each case, so embodied that they, in the case of a force of predetermined size acting axially on them, axially shorten by a predetermined amount, wherein they at least partially assume the shape of a bellows.

7. The coil system as claimed in claim 1, wherein:
   said first leg of said first core sheet and said first leg of said second core sheet are arranged axially offset relative to one another and a length of said coil system parallel to said first legs of said core sheets is greater than a length of said first legs of said core sheets.

8. The coil system as claimed in claim 1, wherein:
   spacers are arranged between said coil and said second legs of said core sheets.

9. A magneto inductive flow measuring device, which includes a coil system as claimed in claim 1.

10. The magneto inductive flow measuring device as claimed in claim 9, which includes a measuring tube, wherein the coil system is so arranged on said measuring tube that said second legs of said core sheets point toward said measuring tube.

11. The magneto inductive flow measuring device as claimed in claim 9, wherein:
    two coil systems are arranged on said measuring tube in a line parallel to a longitudinal axis of said measuring tube; and
    a pole shoe is arranged between said coil systems and said measuring tube.

12. The magneto inductive flow measuring device as claimed in claim 10, wherein:
    a pole shoe is arranged between said measuring tube and said second legs of said first and said third core sheets.

13. The magneto inductive flow measuring device as claimed in claim 12, wherein:
    said pole shoe partially surrounds said measuring tube; and
    said pole shoe has a lesser width parallel to a longitudinal axis of said measuring tube in the region of said coil system.

14. The magneto inductive flow measuring device as claimed in claim 9, it has a holding bracket for positioning the coil system on said measuring tube.

15. The magneto inductive flow measuring device as claimed in claim 9, wherein:
    said measuring tube has a size between DN700 and DN2400, especially between DN1350 and DN2400.

\* \* \* \* \*